(12) United States Patent
Jankowiak

(10) Patent No.: US 7,495,199 B2
(45) Date of Patent: Feb. 24, 2009

(54) MEMS RADIOMETER

(75) Inventor: Patrick Jankowiak, Dallas, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 315 days.

(21) Appl. No.: 11/351,935

(22) Filed: Feb. 10, 2006

(65) Prior Publication Data

US 2007/0187603 A1    Aug. 16, 2007

(51) Int. Cl.
  *G01J 1/00* (2006.01)
  *G01J 1/04* (2006.01)
(52) U.S. Cl. .................. 250/200; 356/216; 356/213; 250/336.1
(58) Field of Classification Search .................. None
  See application file for complete search history.

(56) References Cited

U.S. PATENT DOCUMENTS

| | | | |
|---|---|---|---|
| 3,819,419 A * | 6/1974 | Loose | 136/213 |
| 5,719,324 A | 2/1998 | Thundat et al. | |
| 5,977,544 A * | 11/1999 | Datskos et al. | 250/338.1 |
| 6,118,124 A | 9/2000 | Thundat et al. | |
| 6,312,959 B1 | 11/2001 | Datskos | |
| 6,444,972 B1 * | 9/2002 | Datskos et al. | 250/216 |
| 6,457,360 B1 | 10/2002 | Daraktchiev et al. | |
| 6,636,676 B1 | 10/2003 | Renn | |
| 6,851,297 B2 | 2/2005 | Cunningham et al. | |
| 6,872,947 B1 | 3/2005 | Greywall | |
| 6,954,579 B2 | 10/2005 | Hsu | |
| 7,154,077 B2 * | 12/2006 | Miklatzky et al. | 250/214 C |
| 7,324,323 B2 * | 1/2008 | Aksyuk et al. | 361/287 |
| 2002/0017834 A1 * | 2/2002 | MacDonald | 310/328 |
| 2005/0185179 A1 | 8/2005 | Wang | |

FOREIGN PATENT DOCUMENTS

WO    WO 97/26556    7/1997

OTHER PUBLICATIONS

Datskos, et al., "Photoinduced and thermal stress in silicon microcantilevers," Applied Phyics Letters, AIP, American Institute of Physics, Melville, NY, US, vol. 73, No. 16, Oct. 19, 1998, pp. 2319-2321.
Sulfridge, et al., "Optical Actuation of a Bistable MEMS," Journal of Microelectromechanical Systems, IEEE Service Center, Piscataway, NJ, US, vol. 11, No. 5, Oct. 2002; XP011064800; ISSN: 1057-7157.
European Search Report and Written Opinion, EP 07 25 0536, dated Oct. 8, 2007.

* cited by examiner

*Primary Examiner*—David P Porta
*Assistant Examiner*—Yara N Green
(74) *Attorney, Agent, or Firm*—Lisa K. Jorgenson; Andre M. Szuwalski

(57) ABSTRACT

A radiometer sensor includes a target plate and a micromechanical spring which supports the target plate above a base support. This construction allows for displacement of the target plate in a direction perpendicular to the base support in response to radiation which is received by a top surface of the target plate. The sensor is enclosed within a housing that defines a sealed interior chamber within which a vacuum has been drawn. The target plate preferably is non-deformable in response to received radiation. Capacitive or piezoelectric sensors are provided to detect the displacement of the target plate, and the measured displacement is correlated to determine a received radiation level. Radiometer sensor output signals are quantized and signal processed so as to make a radiation level determination.

33 Claims, 3 Drawing Sheets

MEMS RADIOMETER

BACKGROUND OF THE INVENTION

1. Technical Field of the Invention

The present invention relates to radiometers or other devices which can detect light or other radiation and, more particularly, to a device which uses micro-electro-mechanical structure/system (MEMS) technology for the purpose of measuring radiation from, for example, a high intensity light source.

2. Description of Related Art

Every schoolchild is familiar with the light-mill type of radiometer (also known as William Crookes' Radiometer or a solar engine). This device typically consists of four vanes each of which is blackened on one side and silvered on the other. These vanes are attached to the arms of a rotor which is balanced on a vertical support is such a way that the rotor can turn with very little friction. The mechanism is then encased inside a clear glass bulb which has been pumped out to a high, but not perfect, vacuum.

When sunlight falls on the light-mill, the vanes turn in a direction whereby the blackened side appears to be pushed away from the source of the light. This would appear to be counterintuitive as one would expect light to be absorbed by the blackened side and reflected by the silver side thus causing movement whereby the silver side is pushed away from the light source. A number of explanations have been proposed for how the light-mill operates and why it rotates away from the blackened side. Most explanations, over the years, have been shown to incorrect. One currently accepted explanation is based on the concept of thermal transpiration which refers to the flow of gas through a porous plate caused by temperature differences between the two sides of the plate. Although the vanes of a light-mill are not porous, the concept of thermal transpiration is nonetheless pertinent to device operation. If the gas is initially at the same temperature on each side of the plate, and one side is then heated, there would be a flow of gas from the colder to the hotter side resulting in a higher pressure on the hotter side. With the non-porous vanes of the light-mill, one must focus attention instead on the edges of the vanes wherein the thermomolecular forces that are responsible for thermal transpiration further operate, with an effect known as thermal creep, to cause gas molecules from the blackened side to strike the side edges of the vanes and impart a higher force on the vanes than the colder molecules on the silver side. The resulting behavior is just as if there were a greater force being exerted on the blackened side of the vane.

But what about radiation received on a reflective surface, can it cause movement away from that reflective surface? The fact that electromagnetic radiation exerts a pressure upon any surface exposed to it was deduced theoretically by Maxwell, and proven experimentally by Lebedev, Nichols and Hull. The exerted pressure is very feeble, but can be detected by allowing the radiation to fall upon a delicately poised vane of reflective metal (also known as a Nichols radiometer). The Nichols radiometer measured radiation pressure by directing a beam of light selectively onto one or the other of a pair of small silvered glass mirrors suspended in the manner of a torsion balance by a fine quartz fiber within an enclosure in which the air pressure could be regulated. The light received and reflected by one vane was shown to upset the balance. Current experimentation with electromagnetic radiation exerted pressure relates to the use of solar sails which show promise for the use of solar radiation, when reflected by a large sail-like structure in the vacuum of space, as a drive source spacecraft propulsion.

It is also known in the art to use laser light for the purpose of transporting, suspending or trapping non-atomic sized particles in free space. A variety of micro-sized particles, including solids, solid dielectrics, semiconductors, liquids, aerosols and living cells have been shown in U.S. Pat. No. 6,636,676, the disclosure of which is hereby incorporated by reference, to be position and movement controllable within a hollow-core fiber using a laser light source.

The foregoing show that radiation, and in particular high intensity light, can cause movement of physical matter.

A number of micromechanical sensors are known in the art for use in measuring nuclear and electromagnetic radiation (see, for example, U.S. Pat. Nos. 5,977,544 and 6,118,124, the disclosures of which are hereby incorporated by reference). Such sensors typically utilize a MEMS-type micro-cantilever which is fabricated from materials that respond to impinging radiation by deflecting or changing the resonance frequency of the cantilever. These resulting physical changes (deflections or resonance) in the cantilever beam are then measured using any one of a number of known processes.

It is also known in the art to utilize semiconductor photo-cells, photodiodes and chemical photocells (like cadmium sulfide) to measure the intensity of light. These devices are not always acceptable because the semiconductor materials used in their construction can be damaged by high intensity radiation, there are certain unacceptable minimum size requirements for the construction of a reasonably accurate photometric element, and the devices tend to deteriorate with respect to accuracy of measurement as they age.

SUMMARY OF THE INVENTION

In accordance with an embodiment of the invention, a radiometer comprises a base support, a target plate, and a micro-mechanical spring which supports the target plate above the base support and allows for displacement of the target plate in a direction perpendicular to the base support in response to radiation which is received by a top surface of the target plate.

In accordance with another embodiment of the invention, a radiometer comprises an array of a multiplicity of individual radiometer sensors, each sensor comprising a target plate and a micro-mechanical spring which supports the target plate above a base support for the array and allows for displacement of the target plate in a direction perpendicular to the base support in response to radiation which is received by a top surface of the target plate.

In accordance with another embodiment, a radiometer comprises a housing defining a sealed interior chamber within which a vacuum has been drawn, a target plate positioned within the housing that is non-deformable in response to radiation which is received by a top surface of the target plate, and a micro-mechanical spring which supports the target plate above a base support of the housing and allows for displacement of the target plate in a direction perpendicular to the base support in response to the received radiation.

In accordance with another embodiment, a radiometer comprises an array of radiometer sensors, a quantizer for converting radiometer sensor output signals to a predetermined format; and a signal processor for processing the radiometer sensor output signals in the predetermined format to output radiometric level data. Each radiometer sensor comprises a target plate, and a micro-mechanical spring which supports the target plate above a base support for the array and allows for displacement of the target plate in a direction generally perpendicular to the base support in response to radiation which is received by a top surface of the target plate.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
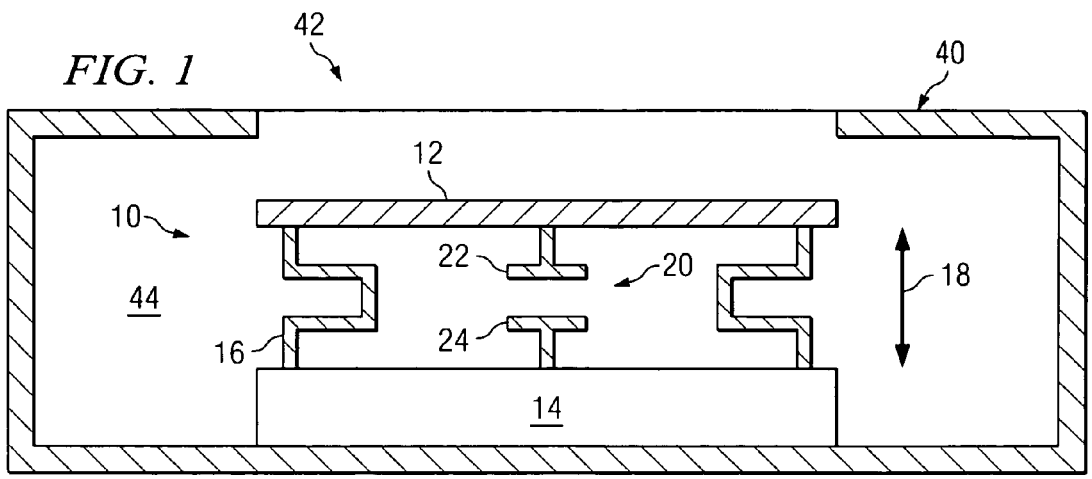
FIG. 1 is a schematic view illustrating a MEMS radiometer/photometer in accordance with an embodiment of the invention.

Reference is now made to FIG. 1 wherein there is shown a schematic view illustrating a MEMS radiometer/photometer in accordance with an embodiment of the invention. The radiometer/photometer 10 includes a target plate 12. The target plate 12 is suspended above a support structure or substrate 14 by a MEMS spring 16. The MEMS spring 16 can take on any one of a number of configurations known in the art which can be constructed using MEMS techniques. A compression spring is illustrated in FIG. 1, but the MEMS spring could alternatively comprise, for example, a support beam or a leaf spring type structure if desired. The MEMS spring 16 allows for a degree of linear displacement of the target plate 12 to occur with respect to (i.e., generally perpendicular to) the support structure/substrate 14 in a direction shown by the arrow 18. In a preferred implementation, that linear displacement target plate 12 occurs in response to impinging radiation (for example, electromagnetic or nuclear radiation).

Figure 2:
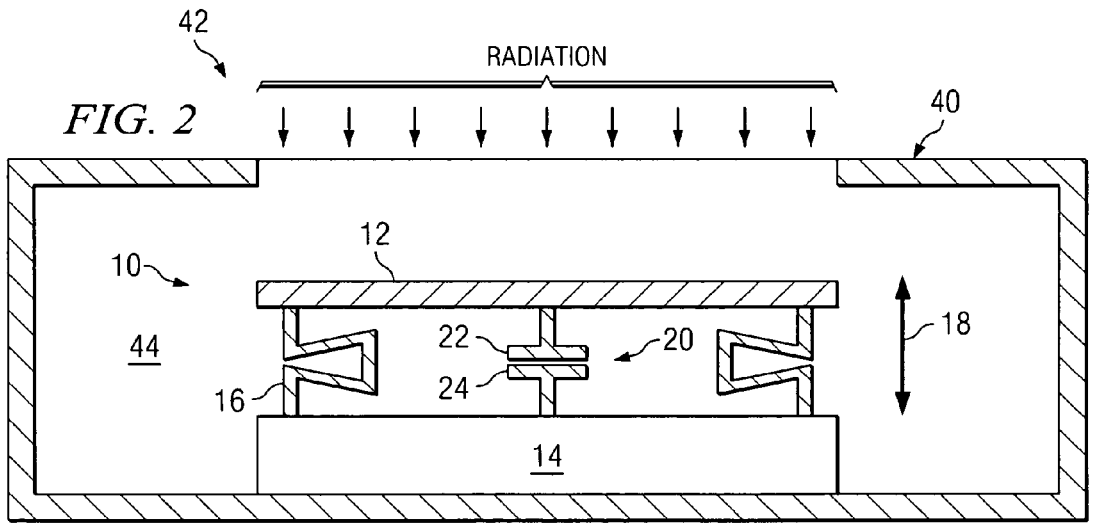
FIG. 2 is a schematic view showing the MEMS radiometer/photometer of FIG. 1 when displaced responsive to impinging received radiation.

Reference is now made to FIG. 2 wherein there is a schematic view showing the MEMS radiometer/photometer of FIG. 1 when linearly displaced responsive to impinging received radiation. It will be noted that the impinging radiation has imparted a force on the top surface of the target plate 12. This imparted force causes a linear displacement in the position of the target plate 12 with respect to the support structure/substrate 14 in the direction of the arrow 18 towards the support structure/substrate 14. This displacement is permitted by a compression or flexing of the MEMS spring 16. Notably, such a linear displacement of the target plate is different than the bending of a micro-cantilever beam as in the above-cited prior art. It will further be understood that a linear displacement of the target plate 12 away from the support structure/substrate 14 is also supported by the MEMS spring 16.

The amount of force exerted by the impinging received radiation is related, for example, in the first order, to the amount of displacement in the direction of the arrow 18. Measuring this displacement accurately is therefore critical to determining the force of the received radiation. A number of mechanisms are available for selection to accomplish this goal. FIGS. 1 and 2, as an example, illustrate the use of a capacitive detector 20. The capacitive detector 20 includes a first capacitor plate 22 associated with the target plate 12 and a second capacitor plate 24 associated with the support structure/substrate 14. As the target plate 12 is displaced in the direction of arrow 18 by the impinging received radiation, a distance between the first and second capacitor plates 22 and 24 changes and the effective capacitance of the capacitive detector 20 changes. This change in capacitance can be measured using conventional and well known electronic circuitry.

Figure 3:
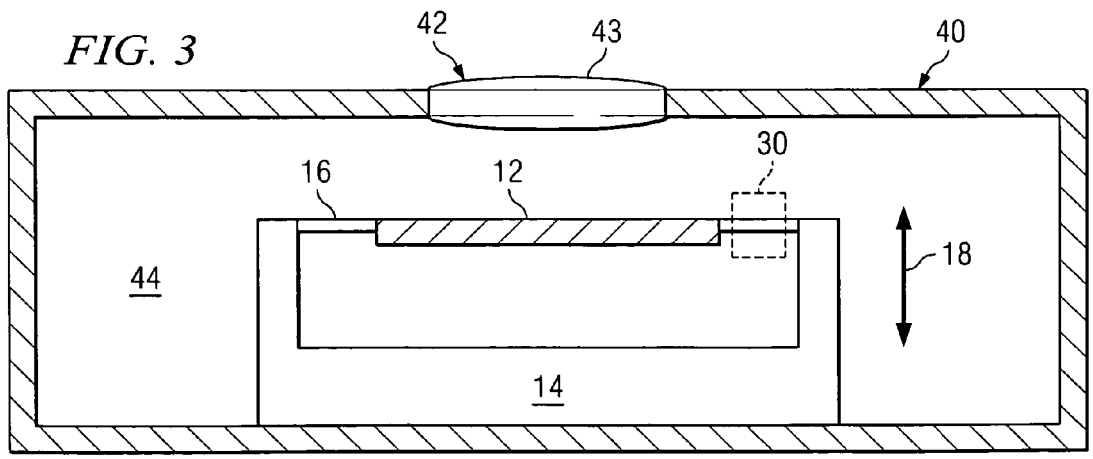
FIG. 3 is a schematic view showing an alternative embodiment for the MEMS radiometer/photometer.

It will be recognized that the capacitive detector 20 is not the only option available for making the displacement measurement. It is also possible to use a piezoelectric (piezoresistive) detector 30 positioned within one or more of the either or both of the MEMS springs 16 (see, FIG. 3). FIG. 3 still further shows the use of a cantilever beam for each MEMS spring 16 in place of the compression spring illustrated in FIGS. 1 and 2. Notably, the target plate 12 is connected to the cantilever beam, but the beam is not the target of the received radiation. The beam will bend or flex, just as with the compression spring described above, in response to a linear displacement of the target plate.

In any event, the displacement as measured by the detectors 20/30 can be correlated (for example, through the use of a look-up table or other algorithm) to determine a received radiation level.

It is important that the target plate 12 itself not bend or flex in response to the impinging received radiation. If it were to do so, then the MEMS spring(s) 16 which support the plate might not accurately flex in response to the radiation and the linear displacement measurements made using the detectors 20 and/or 30 could be inaccurate with respect to the received force. The target plate 12 is accordingly fabricated in a manner which minimizes, and preferably eliminates, any chance of a bend or flex in response to the impinging received radiation.

The surface area of the target plate 12 when implemented using MEMS technologies is likely to be quite small. In view thereof, not much surface area is presented on the top surface of the target plate 12 to receive impinging radiation. Thus, the force exerted by the impinging received radiation on the target plate 12 will be quite small. The MEMS spring(s) 16 accordingly must possess an appropriate spring constant chosen such that the springs are not so stiff that no displacement in the direction of arrow 18 occurs with respect to anticipated or desired radiation levels. To this end, it is envisioned that the MEMS spring(s) 16 will likely have very thin cross sections, and/or be made of selected materials which are more flexible; so as to allow for some deformation/compression in the spring to occur in response to the minute force levels being exerted by the impinging radiation as received by the linearly displaced target plate 12.

In instances where very flexible and/or thin MEMS spring(s) 16 are used, it can be critically important to ensure that the MEMS radiometer/photometer 10 is used only in environments where minimal to no induced vibration is present or likely. Such vibration could, for example, damage or destroy the MEMS spring(s) 16. Additionally, such vibration could induce movement of the target plate 12 (by acting as an accelerometer) such that it would displace to a larger degree than as a result of the received radiation. In such cases, the noise of the vibration induced displacement could overwhelm and make it impossible to detect the radiation induced displacement. There may accordingly be an advantage, to account for the possibility of a vibration operating environment, to include other vibration sensors (for example of the MEMS accelerometer type) whose output could be used to correct the signal output of the MEMS radiometer/photometer 10. In one implementation, the accelerometer may actually be implemented as one or more radiometer/photometer 10 devices with the exception that the target plates 12 of those devices are blocked from receiving radiation. Additionally, there may be an advantage to lower the effective mass of the target plate 12 as much as possible so to minimize its potential operation as an accelerometer. The goal is to make target plate 12 displacement maximally responsive to received radiation and minimally responsive to vibration or other movement.

With reference to FIGS. 1, 2 and 3, the MEMS radiometer/photometer 10 further includes a housing 40 within which the target plate 12, the support structure/substrate 14 and the MEMS spring(s) 16 reside. The housing 40 includes a radiation entry portal 42 (in other words, a window) that is generally perpendicularly aligned with the location of the target plate 12. Notwithstanding the existence of the portal 42, in a preferred implementation the housing 40 effectively completely encloses or seals the MEMS radiometer/photometer 10 structures. The radiation entry portal 42 may further include a focusing lens 43 (see, FIG. 3) which functions to focus received radiation on the location of the target plate 12. In an embodiment of the invention, the housing 40 not only defines a sealed interior chamber 44, but also a vacuum (of any selected suitable degree, but not necessarily a perfect vacuum) is formed within the sealed interior chamber 44.

Figure 4:
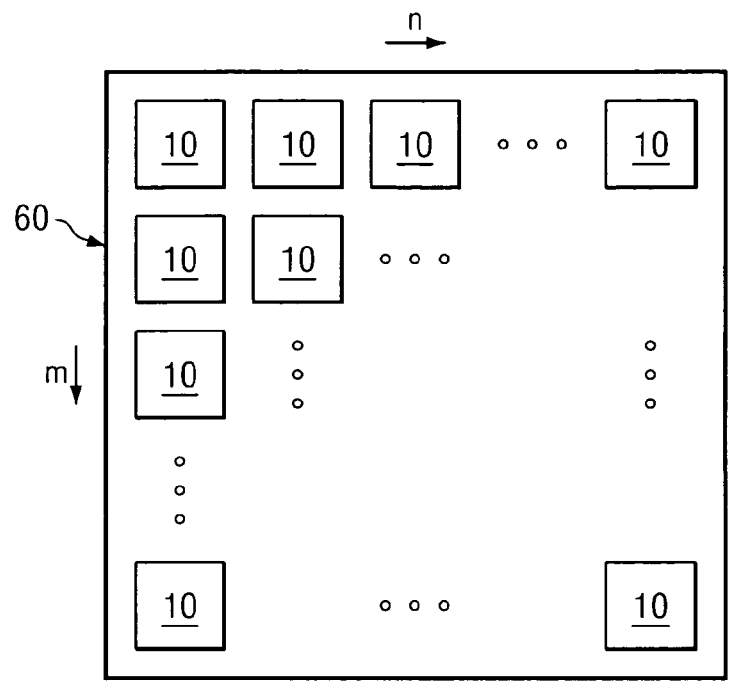
FIG. 4 is a plan schematic view of a radiation sensor array in accordance with an embodiment of the present invention.

Reference is now made to FIG. 4 wherein there is shown a plan schematic view of a radiation sensor array 60 in accordance with an embodiment of the present invention. The sensor array 60 includes a multiplicity of individual MEMS radiometer/photometer 10 structures which are preferably arranged in an n×m array format comprising n columns of m MEMS radiometer/photometer 10 structures per column. The use of an array format for the sensor array 60 increases the effective top surface area of the sensor which is exposed to receive impinging radiation. The measured displacements at each of the individual MEMS radiometer/photometer 10 structures can be mathematically combined in a manner known to those skilled in the art to increase the sensitivity of the overall sensor to the measurement of received radiation. As discussed above, one or more of the radiometer/photometer 10 structures within the array may be implemented as an accelerometer for the purpose of detecting vibration noise. In such a case, the array would be blocked from receiving radiation (for example, blacked out) as the accelerometer array locations and the output signals from those radiometer/photometer 10 structures be separately processable to recover error correction data.

Figure 5A:
FIGS. 5A-5D show exemplary embodiments of a target plate for use in conjunction with the present invention.
Figure 5B:
Figure 5C:
Figure 5D:

The target plate 12 can take on any one of a number of configurations. For example, as shown in FIG. 5A, the target plate 12 comprises a solid, non-porous, structure with a blackened top surface and a lightly colored, or reflective, bottom surface. In another implementation, as shown in FIG. 5B, the target plate 12 comprises a mesh-like, porous, structure with a blackened top surface and a lightly colored, or reflective, bottom surface. In another implementation, as shown in FIG. 5C, the target plate 12 comprises a solid, non-porous, structure made of the same very thin aluminum (or other highly reflective) film material such as that proposed for use in solar sails. In another implementation, as shown in FIG. 5D, the target plate 12 comprises a solid, non-porous, structure made of, or having a top surface coating 62 of, for example, an inert glass so as to prevent out-gassing, or perhaps a highly reflective or at least light colored material. It should be noted that for no implementation is it recommended that the target plate 12 be made of, or have a top surface coating of, a material which conducts charges. There is no desire for the target plate 12 to in any way be electrically photoactive. Efforts should ideally be made to ensure that any coatings used for the target plate 12 not implicate any form of bimetallic or lattice strain effect which would result in any radiation induced deformation of the target plate 12 itself. Deformation with respect to operation as a result of received radiation should occur in the spring, and not in the target plate.

Figure 6:
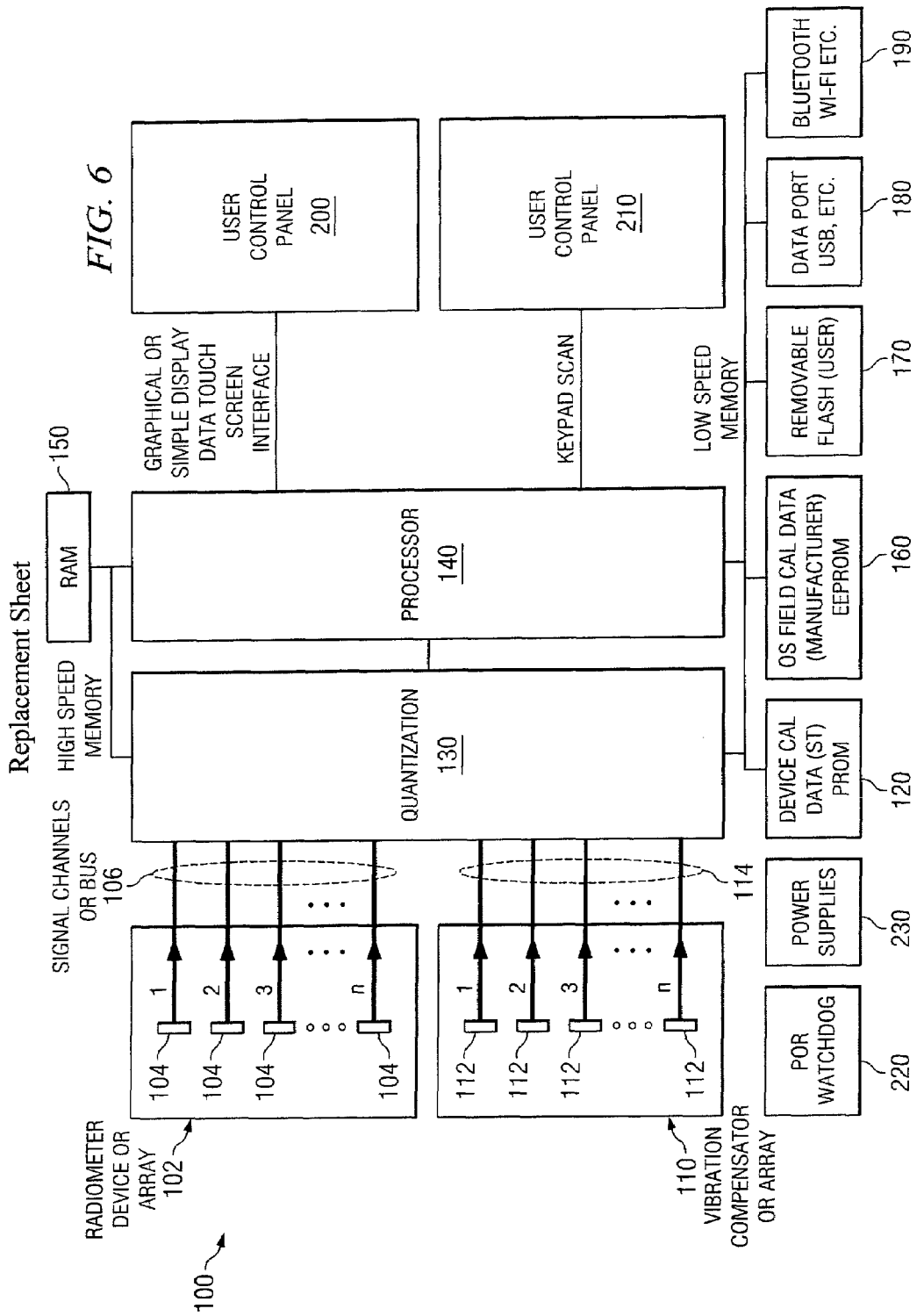
FIG. 6 is a block diagram of a radiometer/photometer system utilizing a MEMS radiometer/photometer in accordance with the present invention.

Reference is now made to FIG. 6 wherein there is shown a block diagram of a radiometer/photometer system 100 utilizing a MEMS radiometer/photometer in accordance with the present invention. The system 100 illustrates one of many possible applications for the MEMS radiometer/photometer 10 as described herein. The following description refers individual blocks of the system 100 and provides a general description of how that block operates and interacts with other blocks as part of real-world end-user equipment. The illustrated blocks may be separate or combined within any combination or number of die, integrated circuit, multi-chip module integrated circuit, circuit board, or enclosure, depending on the specific application. Although illustrated more specifically in the context of a photometer application, it will be understood that the system 100 is generally applicable as a radiometer.

The system 100 includes a radiometer/photometer device/array 102 comprising at least one, and more preferably a plurality or multiplicity of individual radiometer/photometer elements 104 (such as the elements 10 described herein) which detect impinging radiation. A displacement of a target plate as described herein is detected (for example, capacitively or piezoelectrically, or the like) and an output signal 106 indicative thereof is generated from each element 104 and carried on a signal channel or bus structure. The elements 104 within the array are housed within a housing as described herein.

The system 100 further includes a vibration compensator or array 110 comprising means for detecting movement or disturbance that may adversely affect the output of the radiometer/photometer device/array 102. In one embodiment, the compensator/array 110 comprises at least one, and more preferably a plurality or multiplicity of individual elements 112 which are sensitive to vibration (such as, for example, MEMS-type accelerometers). Even more specifically, the compensator/array 110 may comprise one or more individual radiometer/photometer elements 104 (such as the elements 10 described herein) with the exception that these elements are not exposed to (i.e., are blocked from) the impinging radiation. A displacement of a target plate due to vibration is detected (for example, capacitively or piezoelectrically, or the like) and an output signal 114 indicative thereof is generated from each element 112 and carried on a signal channel or bus structure. Importantly, as will be described herein, the compensator/array 110 generates a signal (or signals) for use in canceling any unwanted noise (error correction or compensation), which may come from the radiometer/photometer device or array due to vibration, movement, or other unwanted disturbances. The elements 112 of the array are housed within a housing as described herein. Notably, the array 100 and array 110 may be formed as a single array within a single housing if desired.

The system 100 still further includes a device calibration data store 120. The store 120 contains calibration data programmed by the user or more preferably at the time of device manufacture. The store 120 may be implemented as a PROM, laser-trimming inside another block, or any other suitable non-volatile data storage means. In a preferred implementation, this is a one-time calibration for the life of the device (system 100). The calibration may be applied to any block(s) where it is deemed most effective. The calibration data allow the system 100 to correlate signals output from the array 102 to radiation levels.

The system 100 also includes a quantization circuit (quantizer) 130 where the raw signals, whether analog or digital in nature received over the signal channel(s) or bus from the array 102 or array 110, are converted to a kind of information that is suitable for signal processing for photometric or radiometric detection. Since the output signal from each element 104/112 may by of any nature including variable capacitance, variable frequency, variable voltage, or variable resistance, it is necessary for the quantization circuit 130 to convert these signals to a standard form. Once in this standard form, and in view of the stored calibration data, and such other signal processing operation as necessary, the signals output from the array 102 can be converted to radiation levels.

The system 100 also includes a processor 140. The processor 140 controls the application (system 100) to the extent of controlling and communicating with the other blocks, so that collected information may be transferred, stored, analyzed, and presented to the user in a meaningful form. Suitable quantized signal processing for photometric or radiometric level detection and analysis is also performed by the processor 140.

A random access memory (RAM) 150 provides a fast memory for use in storing the operating system, processor data, and application data while the application is being used. Any of several kinds of suitable memory can be used.

An operating system (O/S) field calibration data store 160 (for example, provided in the form of an EEPROM) stores the processor program code that is generally written by the electronic equipment manufacturer (i.e., the customer who purchases the system 100). This memory store 160 accordingly contains customer/manufacturer field calibration data and various code for features of the system 100 application.

A removable FLASH 170 functionality if also supported by the system 100. An application user can act through the FLASH 170 to retrieve user specific data. For example, the application can write this data in any format or file type chosen by the electronic equipment manufacturer to serve their customer needs (.CSV files, screen captures, etc.).

A data port 180 allows the application implemented by the system 100 to be remotely controlled by wire as part of a larger system. This port 180 can also provide wired I/O and can serve the same function as the removable flash block if, for example, a USB memory card is used. Other wireline data port interfaces can also be supported.

A wireless port 190 allows the application implemented by the system 100 to be remotely controlled by wireless interface, perhaps as part of a larger system. Examples of suitable wireless interface include BLUETOOTH and WI-FI. This port 190 can also provide wireless 1/O.

A display 200 is provided to support user viewing of pertinent data processed by, handled by, input to, or output by, the system 100. In an implementation, a simple alphanumerical display may be used, but a higher resolution graphical display will provide a look at multiple samples over time as well as easy comparison of current data with previous data. A touch screen alternative is a possible convenience.

A user control panel or interface 210 facilitates user set up and control of the application. The panel 120 may, in one implementation, comprise a simple keypad or keyboard. Alternatively, the control panel 210 may be integrated with the display 200 (for example, where touch screen control is supported).

A power on reset (POR) watchdog circuit 220 provides a reset signal to the application/system 100 at power-on, when the user wants, or any time necessary. The watchdog function monitors processor activity as well as critical power supply voltages and can initiate the saving of valuable data or reset the system if it becomes necessary.

A power supply circuit 230 takes power from a battery or the mains or other suitable power source and converts it to the various regulated voltages required by the application/system 100 hardware.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A radiometer, comprising:
a base support;
a target plate; and
a micro-mechanical spring which supports the target plate above the base support and allows for displacement of the target plate in a direction generally perpendicular to the base support in response to radiation which is received by a top surface of the target plate, the micro-mechanical spring being a compression spring positioned underneath the target plate.

2. The radiometer of claim 1 wherein the target plate comprises a solid, non-porous, structure with a blackened top surface and a lightly colored, or reflective, bottom surface.

3. The radiometer of claim 1 wherein the target plate comprises a mesh-like, porous, structure with a blackened top surface and a lightly colored, or reflective, bottom surface.

4. The radiometer of claim 1 wherein the target plate comprises a solid, non-porous, structure having a highly reflective top surface.

5. The radiometer of claim 1 wherein the target plate is non-deformable in response to received radiation.

6. The radiometer of claim 1 wherein the target plate comprises a solid, non-porous, structure having a top surface coating of an inert glass.

7. The radiometer of claim 1 including means for electrically measuring displacement of the target plate in the direction towards the base support.

8. The radiometer of claim 7 wherein the means for electrically measuring comprises a capacitive measuring device.

9. The radiometer of claim 7 wherein the means for electrically measuring comprises a piezoelectric measuring device associated with the micro-mechanical spring.

10. The radiometer of claim 1 further including a housing for enclosing the base support, target plate and micro-mechanical spring, the housing including a window though which the radiation passes to impinge upon the top surface of the target plate.

11. The radiometer of claim 10 further including a focusing lens positioned in the window to focus received radiation on the top surface of the target plate.

12. The radiometer of claim 10 wherein the housing defines a sealed interior chamber within which a vacuum has been drawn.

13. A radiometer, comprising:
an array of a multiplicity of individual radiometer sensors, each sensor comprising:
a target plate; and a micro-mechanical spring which supports the target plate above a base support for the array and allows for displacement of the target plate in a direction generally perpendicular to the base support in response to radiation which is received by a top surface of the target plates the micro-mechanical spring being a compression spring positioned underneath the target plate.

14. The radiometer of claim 13 further including a housing for enclosing the array of individual radiometer sensors.

15. The radiometer of claim 14 wherein the housing defines a sealed interior chamber within which a vacuum has been drawn.

16. The radiometer of claim 15 wherein each target plate is non-deformable in response to received radiation.

17. The radiometer of claim 16 wherein each target plate comprises a solid, non porous, structure with a blackened top surface.

18. The radiometer of claim 16 wherein each target plate comprises a solid, non porous, structure with a highly reflective top surface.

19. The radiometer of claim 16 wherein each target plate comprises a porous, mesh like, structure with a blackened top surface.

20. A radiometer, comprising:
a housing defining a sealed interior chamber within which a vacuum has been drawn;
a target plate positioned within the housing that is non-deformable in response to radiation which is received by a top surface of the target plate; and
a micro-mechanical spring which supports the target plate above a base support of the housing and allows for displacement of the target plate in a direction generally perpendicular to the base support in response to the received radiation, the micro-mechanical spring being a compression spring positioned underneath the target plate.

21. The radiometer of claim 20 further including means for detecting target plate displacement.

22. The radiometer of claim 20 wherein each target plate comprises a solid, non porous, structure with a blackened top surface.

23. The radiometer of claim 20 wherein each target plate comprises a solid, non porous, structure with a highly reflective top surface.

24. The radiometer of claim 20 wherein each target plate comprises a porous, mesh like, structure with a blackened top surface.

25. A radiometer, comprising:
an array of radiometer sensors each generating a radiometer sensor output signal, each sensor comprising:
a target plate; and
a micro-mechanical spring which supports the target plate above a base support for the array and allows for displacement of the target plate in a direction generally perpendicular to the base support in response to radiation which is received by a top surface of the target plate the micro-mechanical spring being a compression spring positioned underneath the target plate;
a quantizer for converting the radiometer sensor output signals to a predetermined format; and
a signal processor for processing the radiometer sensor output signals in the predetermined format to output radiometric level data.

26. The radiometer of claim 25 further including a housing within which the array of radiometer sensors is located, the housing defining a sealed interior chamber within which a vacuum has been drawn.

27. The radiometer of claim 25 wherein at least one of the radiometer sensors within the array is blocked from receiving radiation so as to generate an error correction signal.

28. The radiometer of claim 27 wherein the signal processor processes the radiometer sensor output signals in the predetermined format, in view of the error correction signal, to output radiometric level data.

29. The radiometer of claim 27 wherein the array comprises a first array containing radiometer sensors which are to be exposed to radiation and a second array containing radiometer sensors which are blocked from being exposed to radiation.

30. A radiometer, comprising:
a base support;
a target plate; and
a micro-mechanical spring which supports the target plate above the base support and allows for displacement of the target plate in a direction generally perpendicular to the base support in response to radiation which is received by a top surface of the target plate, the micro-mechanical spring being a cantilever spring positioned adjacent the target plate.

31. The radiometer of claim 30, wherein the target plate does not bend in response to the received radiation.

32. A radiometer, comprising:
an array of a multiplicity of individual radiometer sensors, each sensor comprising:
a target plate; and
a micro-mechanical spring which supports the target plate above a base support for the array and allows for displacement of the target plate in a direction generally perpendicular to the base support in response to radiation which is received by a top surface of the target plate, the micro-mechanical spring being a cantilever spring positioned adjacent the target plate.

33. The radiometer of claim 32, wherein the target plate does not bend in response to the received radiation.

* * * * *